Dec. 30, 1969  W. H. HILL  3,487,192
SELF-ALIGNING WELDING FIXTURE
Filed Oct. 9, 1967
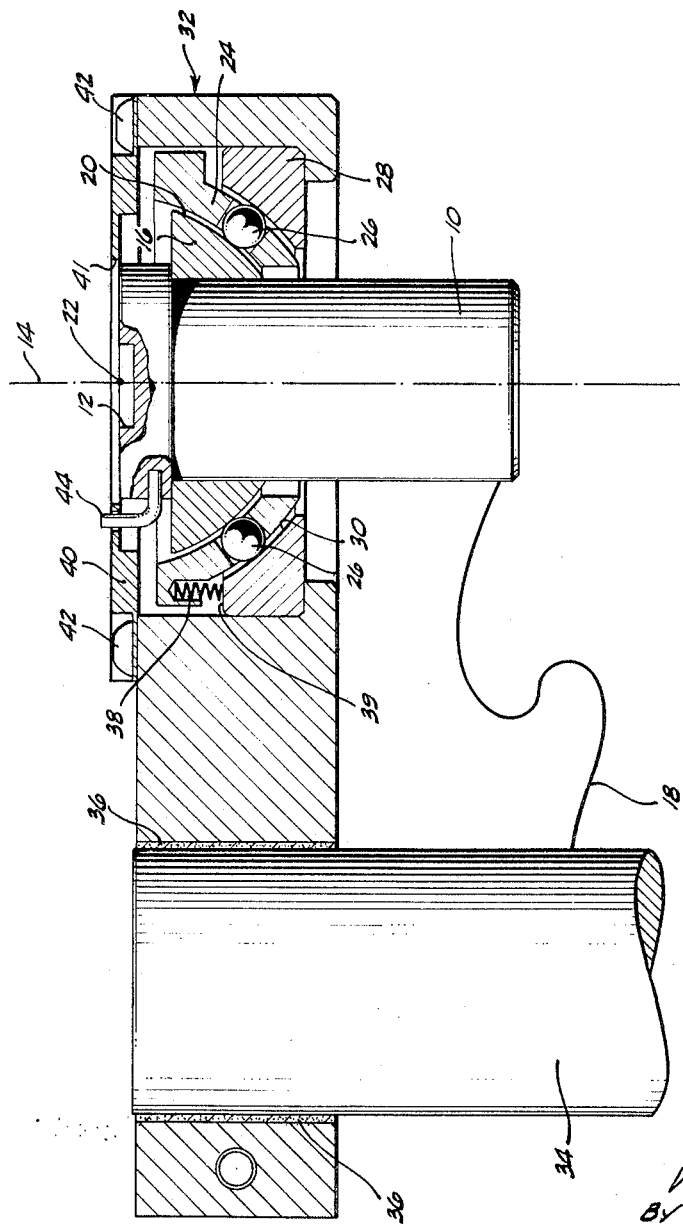
INVENTOR.
WILLIAM H. HILL,
BY
Paul M. Coke
ATTORNEY.

United States Patent Office 3,487,192
Patented Dec. 30, 1969

3,487,192
SELF-ALIGNING WELDING FIXTURE
William H. Hill, Carlsbad, Calif., assignor to Hughes Aircraft Company, Culver City, Calif., a corporation of Delaware
Filed Oct. 9, 1967, Ser. No. 673,880
Int. Cl. B23k 9/24
U.S. Cl. 219—119                3 Claims

ABSTRACT OF THE DISCLOSURE

In the disclosed self-aligning welding fixture, ball bearings contained in a ball bearing cage provide for minimum friction movement between an outer race element that is attached to the welding instrument and an inner race element that is attached to or part of a holding die for parts to-be-welded. The opposing surfaces of the outer and inner race elements over which the ball bearings roll are spherical and have as their center of rotation a common point which lies substantially in the region where the weld is to occur. A cover plate and pin configuration is used when required to restrict rotational movement of the holding die about an axis substantially normal to the plane of the weld.

This invention relates to welding fixtures; more particularly it relates to a device for simply and efficiently adjusting welding fitures to compensate for misalignment or variations in the thickness of parts to-be-welded.

Providing hermetically sealed environments for small circuit elements has been a problem for the microelectronics industry. For example, containers encapsulating a desired atmosphere often leak or allow a damaging incursion of moisture. In sealing a PNP junction transistor, for example, as little an inflow as $10^4$ molecules of water per second through a leak in the container may be damaging to the semiconductor materials and might result in changing the characteristics of the transistor.

One of the techniques commonly employed for hermetically sealing a small circuit element container is to resistance weld a metal cover to a header onto which the small circuit element is attached. A uniform resistance weld between the cover and the header is often difficult to achieve since the contacting surfaces of the cover and the header over the welding area may not have received uniform pressure during the time of the weld formation. The amount of current which passes through a particular region of the weld area is roughly proportional to the amount of pressure applied between the two parts to-be-welded at that area. If variations in thickness of the two elements occur, and they often do, or there is some misalignment of the welding electrodes, some portions of the weld area will receive more pressure than o'hers. More electrical current will pass through refions of higher pressure, since a lower resistance contact between the to-be-welded parts occurs there. This may result in a hermetically sealed weld along only part of the desired area and not achieve a uniform weld over the entire area to be welded. It may also produce overheating in the high pressure region, thereby damaging the nearby circuit element.

Several attempts have been made to solve the problem of non-uniform welding pressure by using a holding fixture that is self-adjusting in its alignment. One such fixture employs a first electrode which, before an actual resistance weld is made, is separated from a holding surface by a cushion of air. A second electrode holding one of the parts to-be-welded is forced onto another part to-be-welded which is held by the first electrode. The pressure from the second electrode displaces the air cushion surrounding the first electrode and causes a friction contact between the first electrode and the holding fixture. This contact is necessary for the flow of electric current to the first electrode and for a stable pedestal for a relatively large, but specific, amount of force to be applied between the two electrodes.

One of the problems associated with the aforementioned type of self-aligning welded fixture is that after the friction contact is made, i.e., just before and during the period when the weld occurs, there is no further adjustment of the electrodes and, hence, no further pressure adjustment over the welding area. Since the slightest aberration in alignment of the electrodes, caused either by adjustment of electrode dies or because of variations in the thickness of the parts to-be-welded, can create uneven welds or overheating, this welding fixture was not satisfactory because it did not provide for electrode alignment just before and during the actual period of current flow.

Accordingly, it is an object of the present invention to provide a simple and practical means for aligning a welding electrode where uniform sealing is important.

It is a further object of the present invention to provide a means for aligning a welding electrode for annular welds.

It is yet a further object of the present invention to provide simple and practical means for aligning a welding electrode where uniform contact prsessure is critical.

It is still a further object of the present invention to provide a self-aligning welding electrode fixture that can automatically align itself to compensate for varying thickness of parts to-be-welded.

It is another object of the present invention to provide a self-aligning welding electrode fixture that will realign itself to a desired posi.ion after it has been displaced from that position.

In accordance with the foregoing objects, a self-aligning welding electrode fixture according to the invention includes a die for holding a part to-be-welded. The die defines a curved surface, the center of rotation of which is located at a point that is substantially in the region adapted to hold the part to-be-welded. A pedestal-type s'ructure which has a partially curved surface similar to that of the holding die, and which partially curved surface has its center of rotation at the aforementioned point, provides support for the holding die. Rollable means disposed between the holding die and the pedestal-type structure provides for minimum friction rotational movement therebetween such that the holder die can rotate relative to the pedestal about three manually perpendicular axes which intersect at the center of rotation of both of the aforementioned surfaces. Electrical power is applied to the parts to be welded via the holder die.

Other objects, advantages and characteristic features of the present invention will become more fully apparent from the following detailed description of a preferred embodiment of the invention when considered in conjunction with the accompanying drawing in which the sole figure is a longitudinal view, partly in cross-section, illustrating a self-aligning welding fixture according to the invention.

Referring to the figure with greater particularity there is shown a part-holding die 10, which functions as a welding electrode, and which is electrically connected to electrode post 34 by a jumper cable illustrated schematically as line 18. The die 10 should be made of electrically conductive material and is preferably of cylindrical configuration, although a prismatic or any other suitable elongated configuration may be used. An approximate center line for the die 10 is designated in the figure by the dashed line 14. The upper end of the die 10 defines an indentation 12 for receiving one of the to-be-welded parts. The shape of the die indentation 12 is, of course, dependent on the shape of the part or parts to-be-welded. Surrounding the die 10 and attached thereto is an inner race element 16 annularly disposed around the center line 14. The outer surface of inner race element 16 is a smooth, highly finished, and hardened spherical segment surface 20. The center of curvature 22 of the spherical surface 20 approximately coincides with the point where center line 14 intersects the plane of the upper end of die 10 and generally in the area of die indentation 12. The inner race element 16 may be made of any suitable material such as hardened steel, for example.

An annular ball bearing cage 24, symmetrically disposed about the race surface 20, holds a plurality of ball bearings 26. In an exemplary embodiment of the invention sixteen ball bearings 26, evenly spaced throughout the ball bearing cage 24, were used, although it should be understood that any practical number of ball bearings 26 are suitable. The bearing cage 24 should be of such shape as to allow free rolling of ball bearings 26 on the inner race surface 20, as well as to allow for minimum friction rotation of inner race element 16 and die 10 about point 22. Specifically, the bearing cage 24 may have a cup-like shape with a minimum diameter that is larger than the cross-sectional diameter of the die 10. The wall of bearing cage 24 should be thick enough to hold the ball bearings 26 and may have a spherical segment surface whose center of curvature, when ball bearings 26 are resting against inner race surface 20, substantially coincides with point 22.

An outer race element 28, also approximately annularly disposed about the center line 14, has a smooth, highly finished, and hardened spherical segment surface 30 whose center of curvature substantially coincides with point 22 when the entire welding fixture is assembled. The outer race element 28 may be made of any suitable material such as steel, for example. The outer race surface 30 provides another free rolling surface for the ball bearings 26 held in ball bearing cage 24 so as to afford minimum friction movement between the inner race element 16 and the outer race element 28. Moreover, the surface 30 also functions as a support, or pedestal for the die 10 and the inner race element 16 via the ball bearings 26.

The outer race element 28 may be a part of or may be permanently fastened to a holding fixture 32. The function of the holding fixture 32 is to attach the die-bearing-cage-outer race configuration to a stable holding device, such as weld head post 34, for example, so that a stable platform for welding may be achieved. The attachment of fixture 32 to post 34 must be electrically insulative so that high current from the welder will not pass through the ball bearings 26 and thereby damage them or the surfaces on which they roll. This electrical insulation may be easily afforded by placing insulative material 36 between fixture 32 and post 34, for example, at places where possible electrically conductive contacts might otherwise occur.

A resilient device such as at least three helical springs 38 may be disposed in slots in the bearing cage 24 and resting on surface 39 of the outer race element 28. The function of springs 38 is to return bearing cage 24 to a predetermined position after the bearing cage 24 and the ball bearings 26 carried thereby have been displaced.

A cover plate 40 defining an aperture 41 which must be large enough to allow insertion of a part to-be-welded may be attached to the top of the holding fixture 32, by means of screws 42, for example, with the aperture 41 registering with the die indentation 12. The main purpose of the cover plate 40 is to minimize rotation of the assembly around the center line 14 when non-circular objects are being welded. The plate 40 also defines an opening for receiving a guide peg 44 attached to the die 10 in order to restrict rotational movement of the die 10 about approximately center line 14 but to still allow its rotation about the other two mutually perpendicular axes through point 22.

The actual dimensions of the die 10, the inner race element 16, bearing holder 24, the ball bearings 26, the outer race element 28, the fixture 32, and other associated welding fixture parts are not critical. The parts, however, must be of such dimension as to allow rotation of the die 10 and the attached inner race element 16 completely about an axis essentially coincident with center line 14 and a few degrees (not more than about 20°) about the other two mutually perpendicular axes through point 22.

In the operation of the self-adjusting welding fixture of the present invention, a header, or whatever device is desired to be welded, is placed on the die indentation 12. If the object to be welded has a non-circular cross-section along the path of the weld, the cover plate 40 and the associated guide pin 44 are used, otherwise they are not needed. A cap, or whatever other device is desired to be welded to the header, contained in a die-holding fixture of another electrode (not shown) is lowered onto the header held on die 10. Should there be variations in the thickness of the header and cap as they are forced together along the areas of the to-be-formed weld, rotation of the ball bearings 26 in the bearing cage 24 along race surfaces 20 and 30 will provide almost frictionless rotational displacement of die 10 about the point 22 to a location which best compensates for the deviation.

The above-described thickness or misalignment compensation provides a uniform pressure contact around the areas to be ultimately joined in the weld. The pressure at the welding surface can be regulated both before and during the actual welding operation. Therefore, a uniform and hermetically sealed weld is possible.

As the upper (other) electrode is removed from the die 10 the system will realign itself. The die 10 and the inner race element 16 will be realigned by means of gravity. The bearing holder 24 and the ball bearings 26 contained therein will be realigned for the most part by means of the springs 38. The entire system quickly reverts back to its original position, thereby readying the system for another welding operation.

It is pointed out that while a self-aligning welding fixture according to the invention is especially suitable to the hermetic seal welding of small circuit elements, the fixture can also be used to weld small diaphragms to any receptacle desired. Ordinance devices, such as squibs, can be advantageously welded using the fixture of the invention. In fact, the welding fixture according to the invention may be used almost in any type of welding arrangement where uniform welding pressure is critical.

Although the present invention has been shown and described with respect to a particular embodiment, nevertheless, various changes and modifications obvious to one skilled in the art to which the invention pertains are deemed to lie within the spirit, scope and contemplation of the invention.

What is claimed is:

1. A self-aligning welding fixture comprising:
    means for holding a part to-be-welded and defining a curved surface the center rotation of which is located at a point substantially in the region adapted to hold said part;
    pedestal means for supporting said holding means and defining a partially curved surface similar to said curved surface of said holding means, said partially curved surface having a center of rotation substantially coincident with said point;
    rollable means disposed between said holding means and said pedestal means for enabling rotational movement therebetween with minimum friction, whereby said holding means may rotate about three mutually perpendicular axes which intersect at said point;
    means for restricting the movement of said holding means about an axis which is substantially normal to the plane of the weld to be formed; said means for restricting comprising an apertured plate rigidly secured to said pedestal means and extending over a surface of said holding means, and a pin attached to said holding means and extending into an aperture in said plate; and means for applying electrical power to said holding means.

2. A self-aligning welding fixture according to claim 1, wherein said rollable means comprises a ball bearing cage, a plurality of ball bearings disposed in said cage and extending beyond opposite surfaces of said cage, and resilient means for urging said bearing cage toward a predetermined position.

3. A self-aligned welding fixture comprising:

a substantially cylindrical die defining an indentation at one end for holding a part to be welded;

an annular inner race element attached to the lateral surface of said cylindrical die, said inner race element defining a curved surface the center of rotation of which is located at a point which is substantially in the region where said part is being held;

an annular outer race element coaxially disposed about said cylindrical die, said outer race element defining a partially curved surface similar to and spaced from said curved surface of said inner race element, said partially curved surface having a center of rotation substantially coincident with said point;

an annular ball bearing cage disposed between the facing curved surfaces of said inner and outer race elements, a plurality of ball bearings disposed in said cage and extending beyond opposite surfaces of said cage into contact with said facing curved surfaces;

a plurality of springs mounted between facing surfaces of said ball bearing cage and said outer race element and circumferentially spaced along said facing surfaces of said ball bearing cage and said outer race element for urging said ball bearing cage and said outer race element to a predetermined rest position relative to one another; and means for applying electrical power to said die.

References Cited

UNITED STATES PATENTS

| | | | |
|---|---|---|---|
| 1,992,990 | 3/1935 | Burns | 219—120 |
| 2,346,088 | 4/1944 | Shobert | 219—119 |
| 2,971,770 | 2/1961 | Wagner | 308—194 X |

JOSEPH V. TRUHE, Primary Examiner

J. G. SMITH, Assistant Examiner

U.S. Cl. X.R.

287—21, 87